United States Patent
Hadfield et al.

[11] 3,844,440
[45] Oct. 29, 1974

[54] FLOOR BOXES

[75] Inventors: Robert W. Hadfield, Belpre, Ohio; William H. Harding, Norristown, Pa.

[73] Assignee: Textron Inc., Providence, R.I.

[22] Filed: Aug. 6, 1973

[21] Appl. No.: 385,819

Related U.S. Application Data

[62] Division of Ser. No. 142,318, May 11, 1971, Pat. No. 3,784,042.

[52] U.S. Cl................ 220/3.7, 52/221, 174/57, 220/3.94
[51] Int. Cl.............................. H02q 3/08
[58] Field of Search............ 220/3.7, 3.8, 3.9, 3.92, 220/3.94, 3.3.3.4; 174/48, 49, 51, 53, 57; 52/221, 127

[56] References Cited
UNITED STATES PATENTS

| | | | |
|---|---|---|---|
| 3,013,690 | 12/1961 | Johnson et al. | 220/3.7 |
| 3,318,476 | 5/1967 | Clark | 220/3.4 |
| 3,338,450 | 8/1967 | Rose | 220/3.94 |
| 3,368,311 | 2/1968 | Fork | 52/127 |
| 3,485,933 | 12/1969 | Flachbarth | 174/51 |
| 3,550,336 | 12/1970 | Halkonich et al. | 52/221 |

*Primary Examiner*—Billy S. Taylor
*Attorney, Agent, or Firm*—Frederick J. Olsson

[57] ABSTRACT

An underfloor box made of identical upper and lower sections which abut each other through flanges. The flanges carry fasteners which lock the flanges together and also serve as nuts for leveling lugs. In one particular form, the box is combined with an adapter which conditions the box to accept either small or large size ducts.

2 Claims, 8 Drawing Figures

FLOOR BOXES

This application is a divisional of our co-pending application Ser. No. 142,318, and now Pat. No. 3,784,042 filed May 11, 1971 and entitled UNDERFLOOR BOXES.

This invention relates in general to underfloor electrical distribution systems. More specifically, the invention relates to improvements in junction and floor boxes for such boxes.

To this end, the invention contemplates forming a box by stamping out a pair of parts which are identical in shape, modifying one of the parts with threaded holes for grounding screws and also with an access opening for an access unit, mounting the modified part on top of the other part with the upper parts being in contact through abutting flanges and securing the parts together with fasteners mounted in the flanges and functioning to lock the flanges together and also serving as nuts for leveling lugs.

Thus the design provides for a box made from a basic single stamping whereby the box per se comprises only one pair of components which are assembled simply by butting the same together and securing in place by fasteners which are quickly mounted by power actuated tools.

Another object of the invention is to provide a design for a two-level junction box which permits a wholesale reduction in the number of box configurations necessary to meet the variety of combinations of levels, sizes and positions conventionally found at duct intersections in underfloor systems.

To this end the invention contemplates the combination of a two-level junction box and one or more adapters, the box having top openings for distribution ducts and lower openings for feeder ducts with all the openings being the same size and each adapted to receive, alternatively, either a larger size duct normally used in feeder and distribution runs or the adapter which conditions the opening to receive smaller size duct. The adapter is reversible so that the smaller duct can be put on either the left or right hand side of an opening and is configured to provide for grounding of smaller duct whether on the left or right hand position by the same screws which ground the larger duct.

The design provides that one two-level box and three adapters can be selectively combined so as to provide a box which fits any one of the usual 24 combinations of size, level and position of ducts at intersections. Not only does this save in box inventory per se but saves on engineering, scheduling and fabrication costs. A very big advantage is that the design is readily adaptable for changes during an underfloor installation.

The invention will be described in connection with a junction box for a two-level system and a floor box used primarily in a single level system, the foregoing embodiments being shown in the following drawings wherein:

FIG. 1a is a elevational view taken on the lines 1a—1a of FIG. 1;

Figure 1:
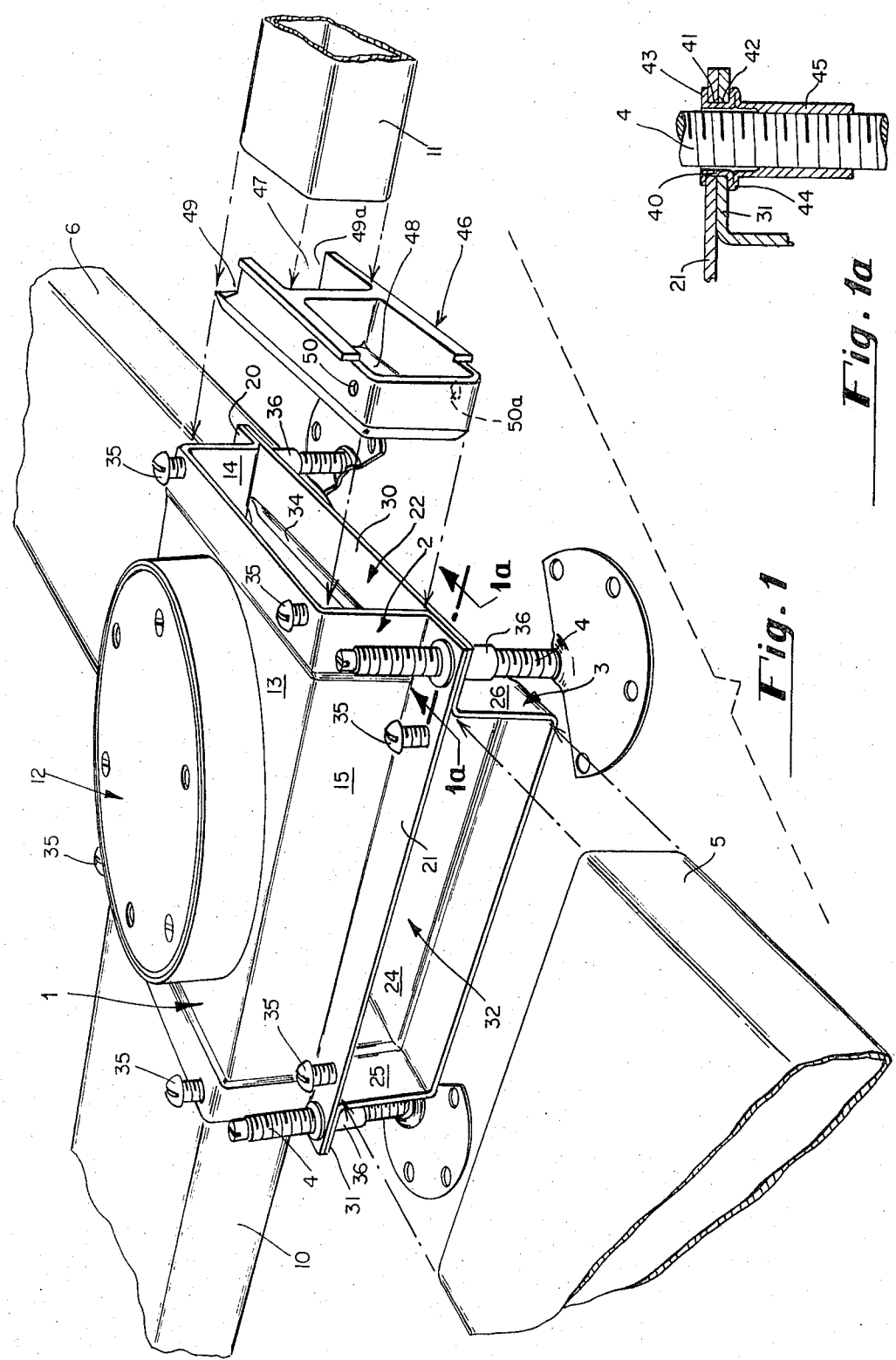
FIG. 1 is a perspective view of a two-level junction box constructed in accordance with the invention and further illustrating an adapter and feeder and distribution ducts.

In FIG. 1, the two-level junction box 1 has an upper section or body 2 and a lower section or body 3. The box is supported on the leveling lugs 4. The lower section 3 is adapted to receive feeder ducts such as ducts 5 and 6 whereas the upper section 2 is adapted to receive distribution ducts such as the ducts 10 and 11. The junction box 1 is hollow and access to the interior is provided through the access unit 12 which is of conventional construction.

The upper body 2 has a top wall 13 and a pair of side walls 14 and 15. The top wall 13 has an opening 16 (FIG. 3) providing access to the interior of the box through the access unit 12.

On the upper body are the upper flanges 20 and 21 which are connected to and extend outwardly from the side walls 14 and 15. The side walls 14 and 15 are disposed and spaced from one another so that they form openings 22 and 23. The openings 22 and 23 are the ends of a channel formed by the top wall 13 and side walls 14 and 15.

The lower body 3 has bottom wall 24 and side wall 25 and 26 together with lower flanges 30 and 31 which are connected to and extend outwardly from the lower side walls. The lower flanges 30 and 31 respectively extend across the upper body openings 22 and 23 and form part of the same.

The lower body side walls 25 and 26 are spaced and disposed so as to form the openings 32 and 33. The upper flanges 21 and 20 respectively form part of the openings 32 and 33. The openings 32 and 33 are the ends of a channel formed by bottom 24 and side walls 25 and 26.

The upper openings 22 and 23 and lower openings 32 and 33 are each identical in size and are adapted to receive the larger size underfloor duct. To define the innermost position of a connected duct, each opening is provided with stop means such as the stop 34 and the opening 22. The outer openings have similar stop means.

At each of the four corners of the upper body 2 and on the upper flanges 20 and 21 there are threaded holes for accepting the set screws 35 which secure and ground a larger size duct in the opening (or adapter as will be explained later).

In the foregoing description it will be apparent that the upper and lower sections are identical in construction except that the upper section has the threaded holes for the set screws and an opening for the access unit 12. Thus a single part can be used for both the upper and lower sections of the box with the upper section being slightly modified. This has substantial advantage as previously indicated. The manner in which the upper and lower bodies are joined together is an important feature of the invention and this is explained following.

Figure 3:
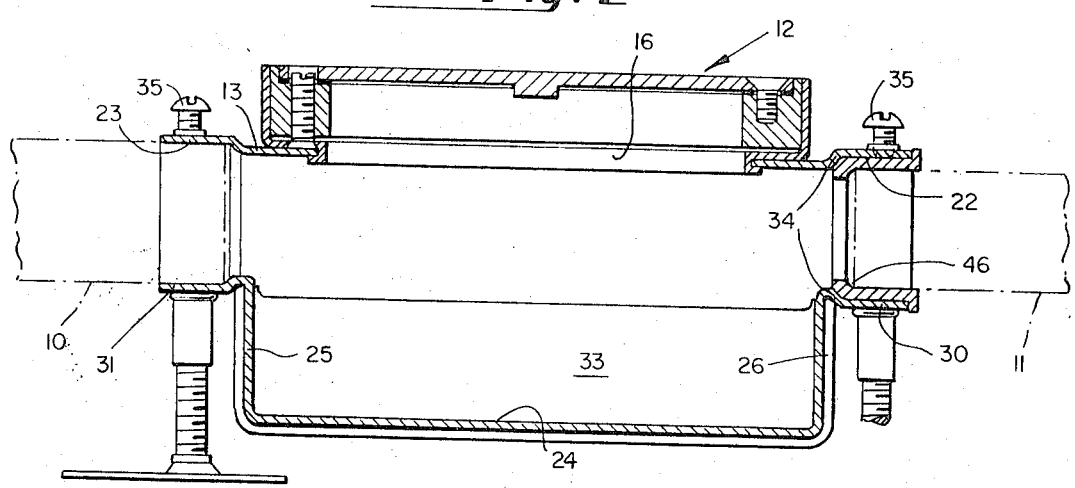
FIG. 3 is a view taken on the lines 3—3 of the box of FIG. 22.
Figure 4:
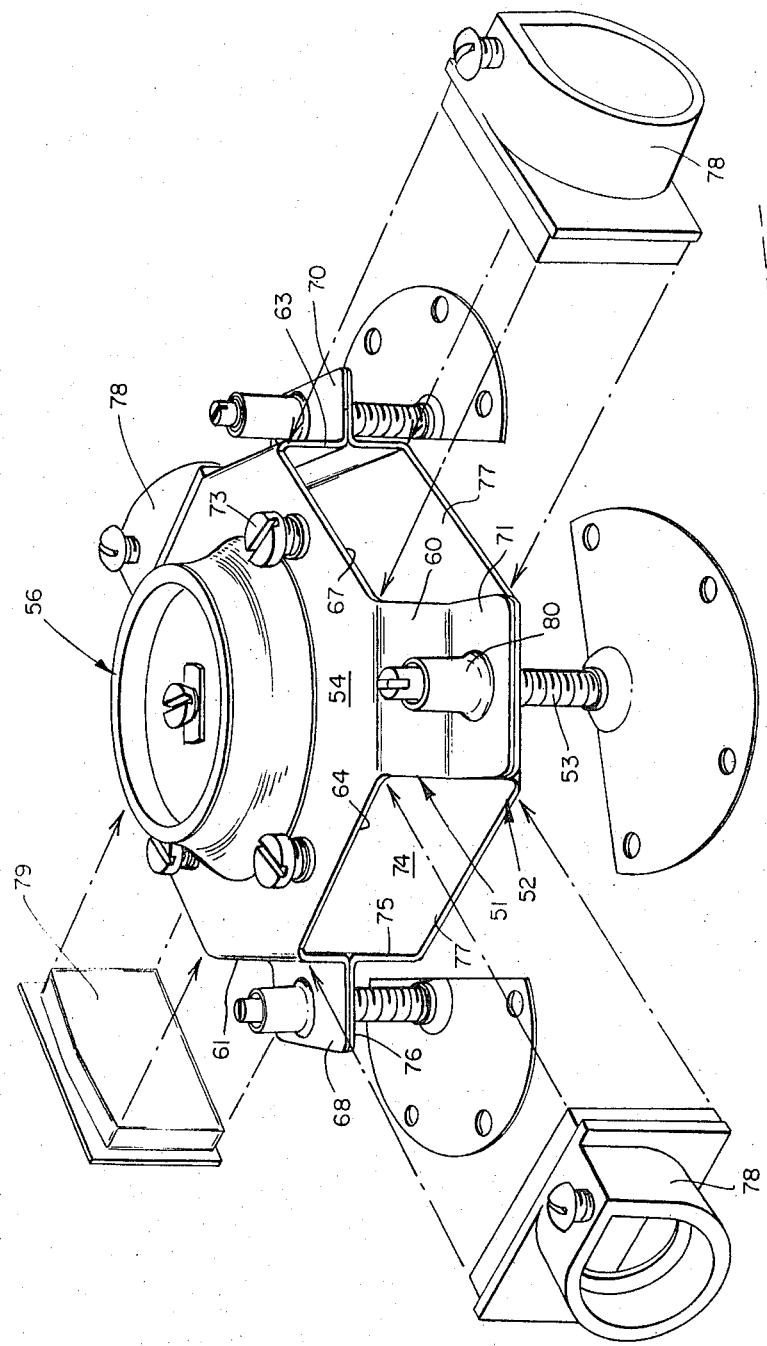
FIG. 4 is a perspective view of a floor box constructed in accordance with the invention.
Figure 5:
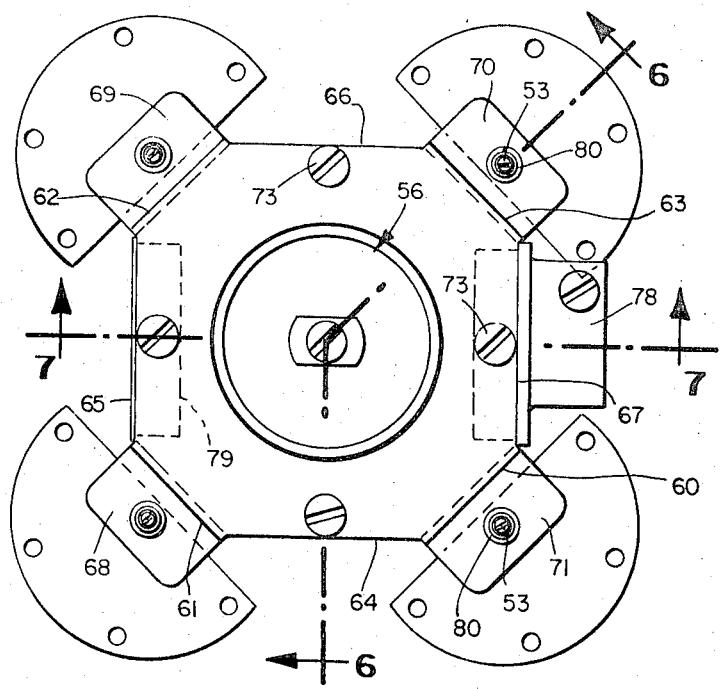
FIG. 5 is a plan view of the box of FIG. 4.
Figure 6:
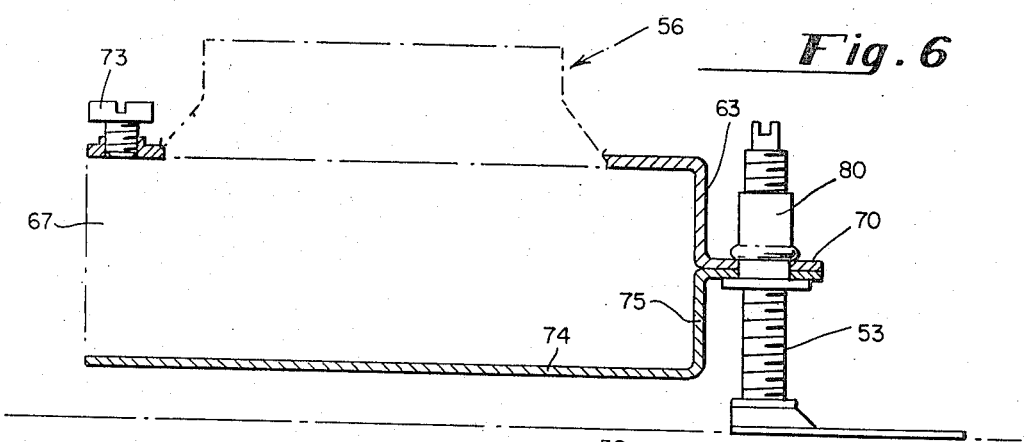
FIG. 6 is an elevational view taken on the lines 6—6 of FIG. 5.
Figure 7:
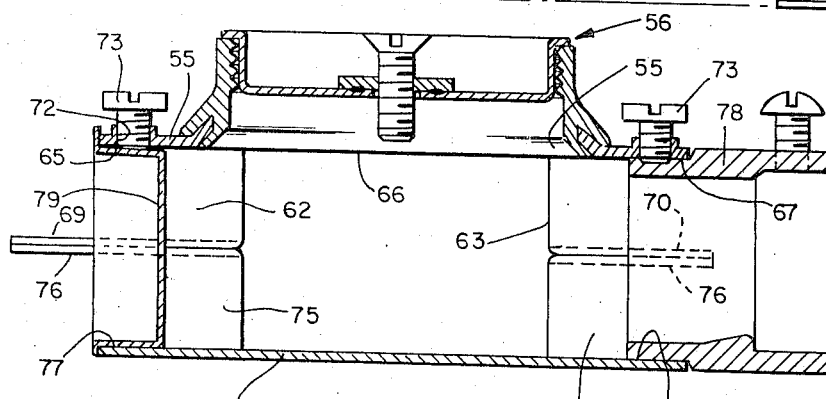
FIG. 7 is an elevational view taken on the lines 7—7 of FIG. 5.

As will be apparent, the upper and lower bodies interengage through the medium of the engaged flanges at the four corners of the box. Thus the opposite ends of the upper flanges 20 and 21 and the opposite ends of the lower flanges 30 and 31 engage each other at each corner. At each corner of the box, the upper and lower flanges are provided with aligned apertures which receive fasteners 36 rigidly holding the upper and lower flanges in tight engagement and in addition serving as nuts for the leveling lugs 4. The structure of the fasteners is identical and the details are shown in FIG. 3.

The fastener comprises a body 40 which extends through the aligned apertures 41 and 42 in the flanges 21 and 31. A top shoulder 43 engages the top flange 21 and a bottom shoulder 44 engages the lower flange 31. The shoulders 43 and 44 are formed so as to tightly press the flanges 21 and 31 together. The lower portion 45 of the body 40 is provided with threads and forms a nut means engaging the threads on the leveling lug 4. In assembly, the shoulder 43 is first formed on the fastener body, the fastener inserted in the aligned apertures and then the other shoulder 44 formed by a power-operated hand tool.

It will be understood that the dual function feature of the fastener enhances cost reduction by effecting savings in inventory and in fabrication and assembly costs.

The adapter which conditions the box for use in any combination of ducts at an intersection will next be explained.

Figure 2:
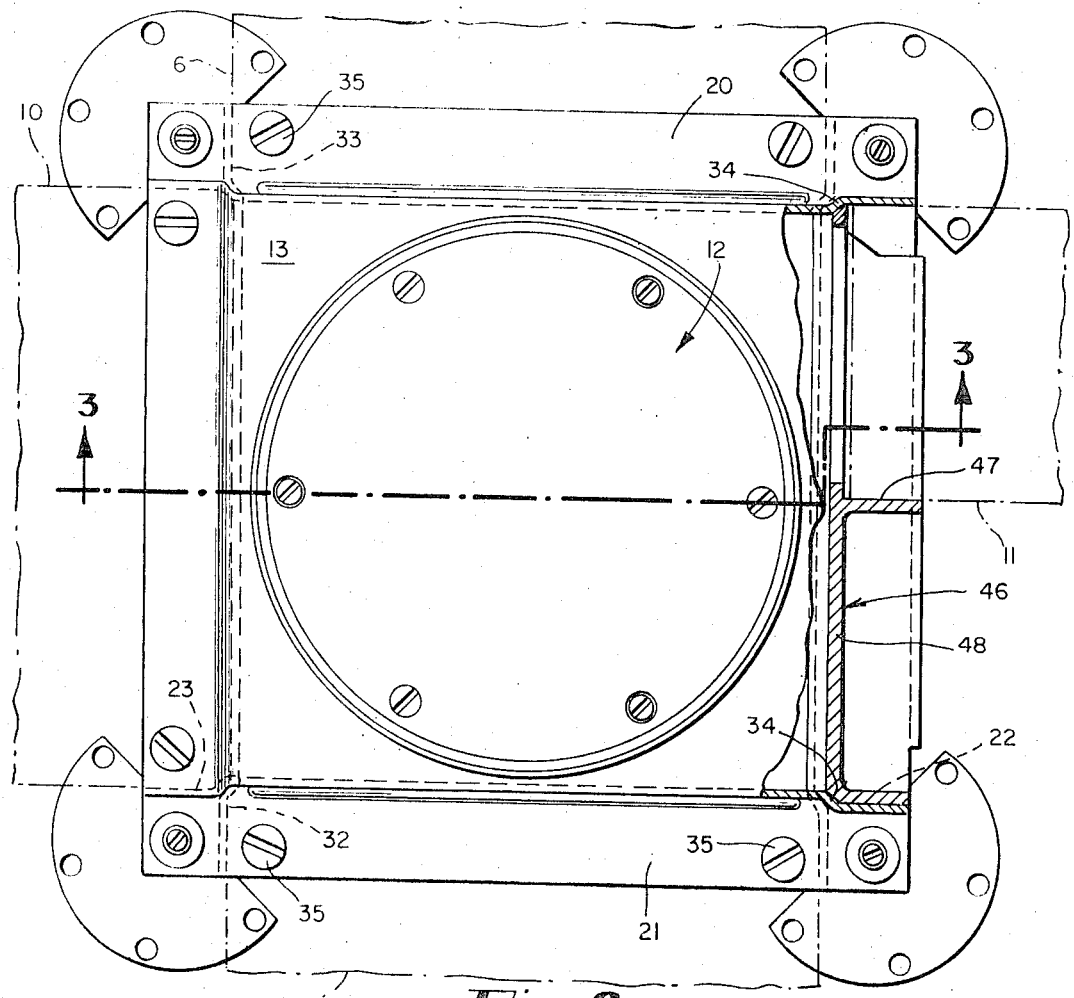
FIG. 2 is a plan view of the junction box of FIG. 1.

As indicated in FIG. 1, the adapter 46 is generally rectangular in shape and is the same cross-sectional size as the openings 22, etc, so as to be insertable into an opening up against a stop as shown in FIGS. 2 and 3. The adapter has an open-ended socket 47 which is in communication with the inside of the box. Adjacent the socket 47 is a barrier 48 which closes off the unused portion of the opening and prevents entry of concrete during a pour.

The socket 47 is configured to receive the conventional smaller size duct such as duct 11 and thereby converts an opening from a large to a smaller size. The top and bottom of the adapter 46 are provided with semi-circular cut-out sections 49 and 49a and also with circular cut-out sections 50 and 50a.

The cut-outs 50 and 50a provide means for locking the adapter in the opening and the cut-outs 49 and 49a permit the set screws to contact the smaller duct and ground the same. For example, when the adapter 46 is in the opening 22, the left hand set screw 35 extends down into the circular cut-out 50 while the right hand set screw 35 extends down through the cut-out 49 to engage the top of the duct 11. The same set screws are used to lock and ground the large duct in an opening.

The adapter configuration described provides that the adapter is reversible in position. This permits the smaller duct 11 to be connectable on either the left or right hand side of an opening. For example, if the adapter shown in FIG. 1 is turned 180°, the socket and barrier occupy reverse positions and the duct 11 can be connected to the left hand side of the opening. The set screws 35 will function in the cut-outs 49a and 50a to lock the adapter and ground the duct.

In FIGS. 4 through 7 we have shown the invention as applied to a floor box.

The floor box comprises an upper body 51, a lower body 52, and is supported by the leveling lugs 53. The upper body 51 has a top wall 54 provided with an opening 55 (FIG. 7) to receive the access unit 56.

The upper body has four side walls 60, 61, 62 and 63 which are disposed and spaced apart from one another to provide upper openings 64, 65, 66 and 67. The upper side walls carry a plurality of upper flanges 68, 69, 70 and 71, which extend outwardly from the walls. The top 54 has a plurality of threaded apertures 72 carrying the securing and grounding set screws 73.

The lower body 52 is identical in construction except for the access unit opening and the threaded holes for the grounding set screws. The lower body includes bottom 74, side walls 75 and flanges 76. The side walls are spaced and disposed to form a plurality of openings such as the openings 77 which are respectively in vertical alignment with the openings 64–67. The aligned upper and lower openings form an opening into which can be inserted an adapter 78 or closure 79. The set screws 73 hold the adapter and closure member in position and also ground the same to the box.

The upper flanges 68–71 respectively abut the lower flanges 76 and carry aligned apertures accommodating the fasteners 80. These fasteners are identical in construction and function to the fasteners of FIG. 1 (except that the nut position is above the upper flange) as will be apparent from an inspection of FIG. 6.

We claim:

1. A floor box for interconnecting underfloor wiring conduits comprising:

a hollow upper body having a top wall and a plurality of side walls, the top wall having an opening to provide access to the interior of the box and adjacent side walls being disposed and spaced apart from one another to provide an upper opening and there being as many openings as there are side walls;

a plurality of upper flanges respectively connected to and extending outwardly from the bottom of the upper side walls;

a hollow lower body disposed beneath the upper body, the lower body having a bottom wall and a plurality of side walls, adjacent side walls being disposed and spaced apart one from another to provide a lower opening and there being as many openings as there are lower side walls;

a plurality of lower flanges respectively connected to and extending outwardly from the top of the lower side walls and being respectively engaged with the upper flanges whereby the two bodies form a hollow box and the upper and lower openings being in vertical alignment whereby to provide an opening to receive, alternatively, a closure cap or a conduit adapter;

a plurality of aligned apertures respectively in the upper and lower flanges;

a plurality of fasteners, each fastener comprising a hollow body of substantial axial length extending through an aligned aperture, a top shoulder on the body extending over and engaging the upper flange and a bottom shoulder on the body extending over and engaging the lower flange, the two shoulders holding the flanges in tight engagement, and the interior of the body being threaded throughout its length; and a plurality of threaded leveling lugs respectively threaded to said fastener threads, the lugs providing for vertical adjustment of the box and said substantial axial length of the fastener body being for use in providing vertical support and adjustment for the box.

2. A floor box for interconnecting underfloor wiring conduits comprising:

a hollow upper body having a top wall and a plurality of side walls, the top wall having an opening to provide access to the interior of the box and adjacent side walls being disposed and spaced apart from one another to provide an upper opening and there being as many openings as there are side walls;

a plurality of upper flanges respectively connected to and extending outwardly from the bottom of the upper side walls;

a hollow lower body disposed beneath the upper body, the lower body having a bottom wall and a plurality of side walls, adjacent side walls being disposed and spaced apart one from another to provide a lower opening and there being as many openings as there are lower side walls;

a plurality of lower flanges respectively connected to and extending outwardly from the top of the lower side walls and being respectively engaged with the upper flanges whereby the two bodies form a hollow box and the upper and lower openings being in vertical alignment whereby to provide an opening to receive, alternatively, a closure cap or a conduit adapter;

a plurality of aligned apertures respectively in the upper and lower flanges;

a plurality of fasteners respectively extending through the aligned apertures, each fastener having means holding said top and bottom flanges in tight engagement and further having means supporting a leveling lug for use in adjusting the box in a vertical direction; and a plurality of leveling lugs respectively mounted in said means.

* * * * *